M. SAMBURG.
CLOTH LAYING MACHINE.
APPLICATION FILED OCT. 26, 1915.
1,289,552.
Patented Dec. 31, 1918.
4 SHEETS—SHEET 1.
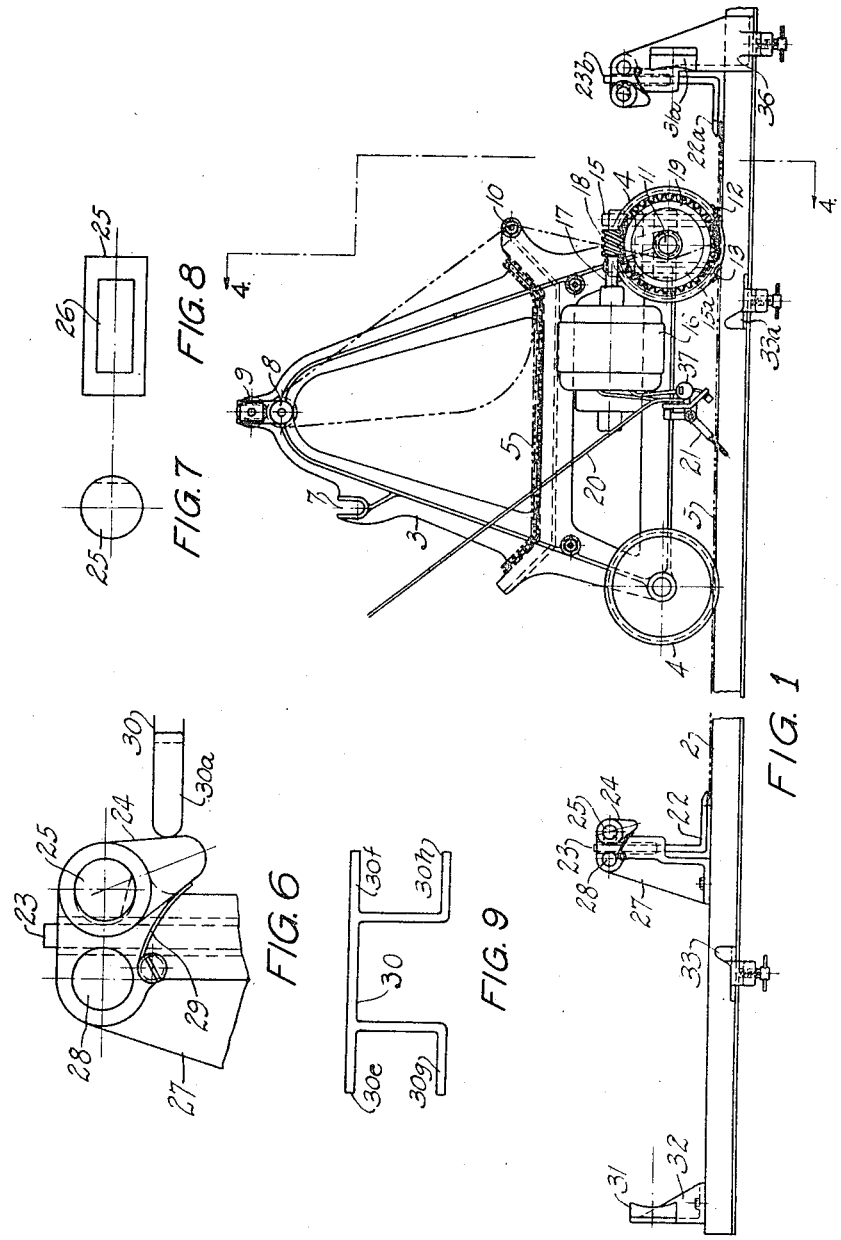
Inventor
MAURICE SAMBURG
By his Attorney
Albert Bersin

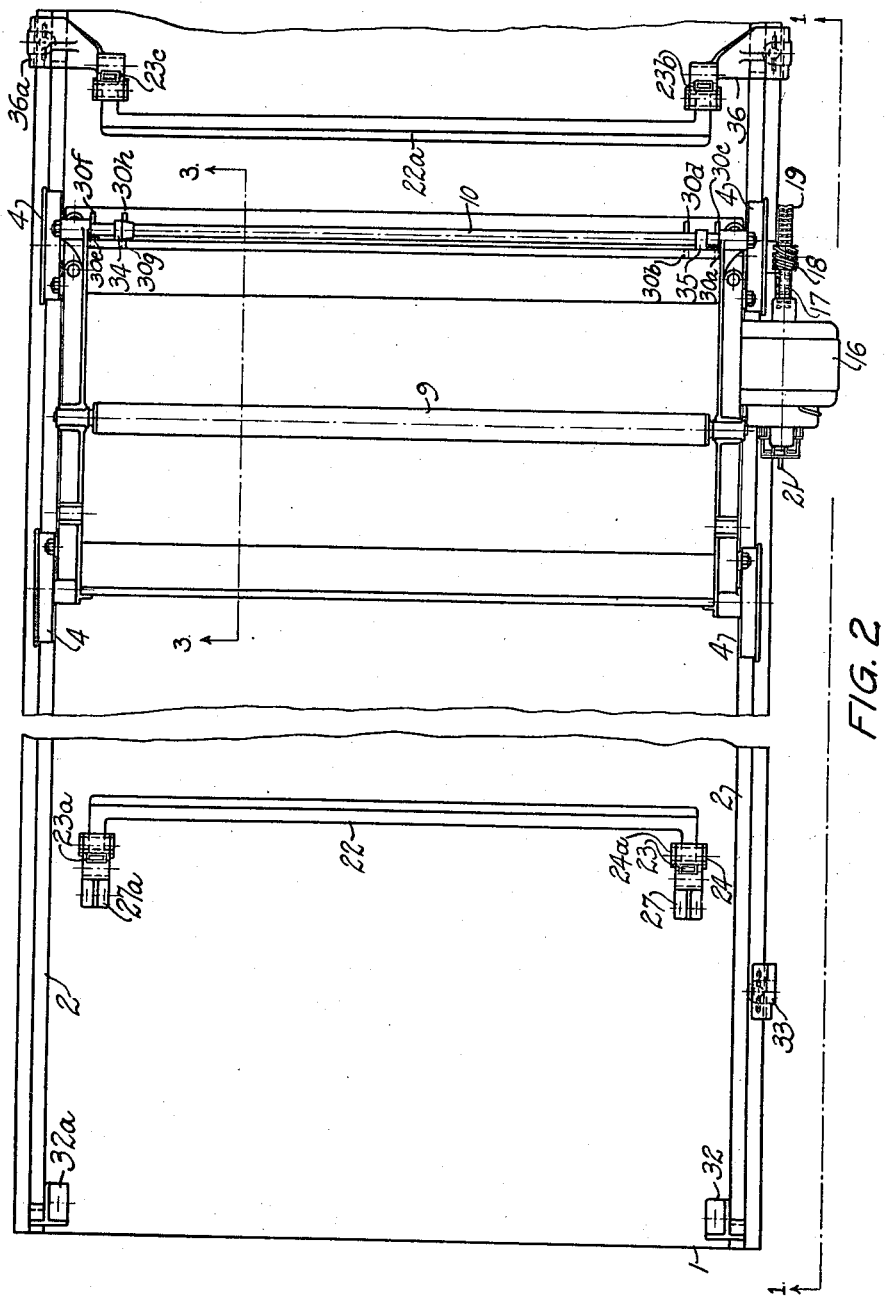

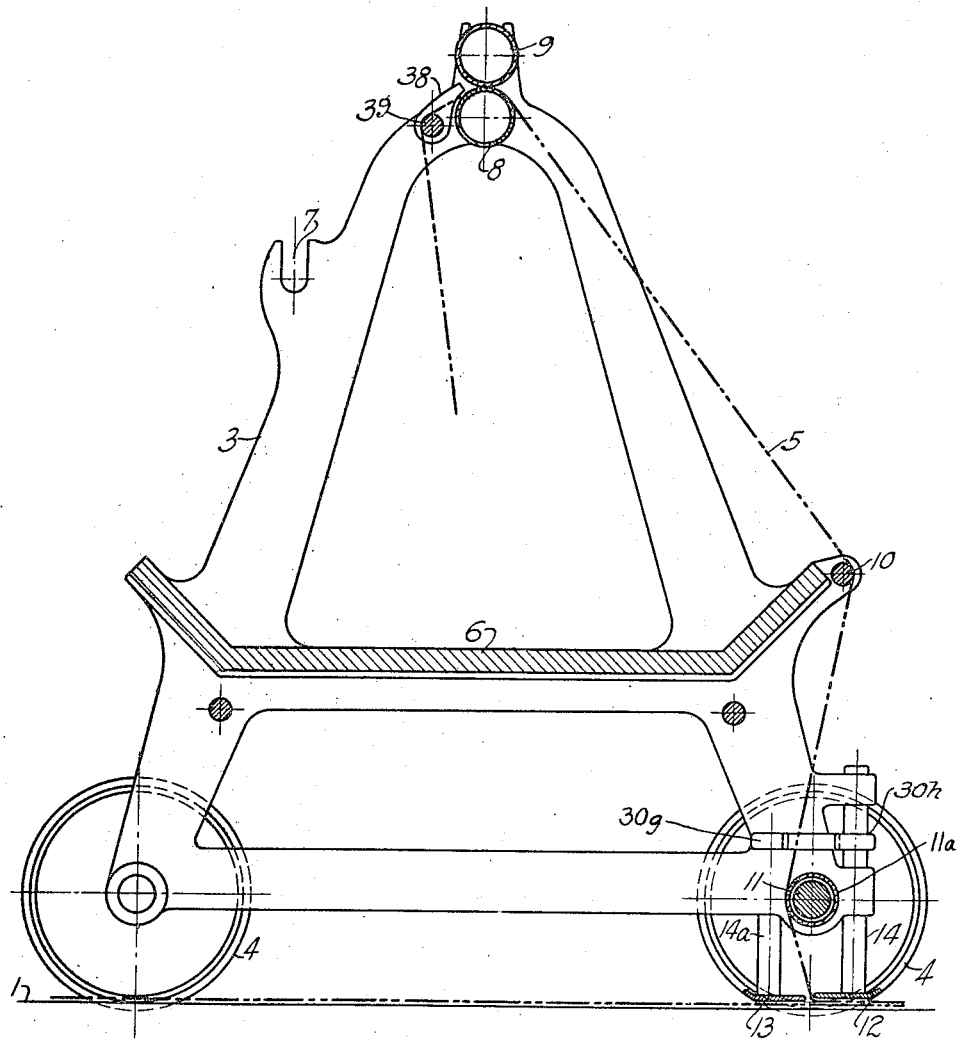

Inventor
MAURICE SAMBURG
By his Attorney
Albert Bersin

UNITED STATES PATENT OFFICE.

MAURICE SAMBURG, OF NEW YORK, N. Y.

CLOTH-LAYING MACHINE.

1,289,552.  Specification of Letters Patent.  Patented Dec. 31, 1918.

Application filed October 26, 1915. Serial No. 57,927.

*To all whom it may concern:*

Be it known that I, MAURICE SAMBURG, citizen of the United States, and resident of borough of Bronx, city of New York, in the county of Bronx and State of New York, have invented certain new and useful Improvements in Cloth-Laying Machines, of which the following is a specification.

This invention relates to automatic cloth laying machines and has for its object the obtaining of an efficient machine, simple in construction, inexpensive to manufacture, easily operated and readily adjusted.

I obtain this object by having developed a machine containing only few moving parts and having no complicated mechanical movements.

One of the many advantages of my device is that on account of the simplicity of its operation, it can be manipulated and its work supervised by an unskilled person and therefore a saving in the cost of labor is obtained.

Another advantage of my machine is that the control switch does not travel with the carriage but is stationary, therefore one person is enabled to supervise the operation, provided he is within view of the operator and switch board.

Another advantage of my machine is that two or more layers of fabric, side by side, may be spread on the table in one operation, provided the table is wide enough.

An additional feature of my machine is that the fabric is held down by the weight of the runners, therefore the machine automatically adjusts itself for any thickness of material and also stretches it, thereby eliminating waste.

Another feature of my machine is that the motor is mounted on and travels with the carriage and therefore the necessity of using long racks or worms is eliminated.

An additional feature of my machine is that it is provided with a device for automatically registering the number of layers of fabric spread.

Another feature of my machine is that it will spread material furnished either in rolls or folds.

Figure 5:
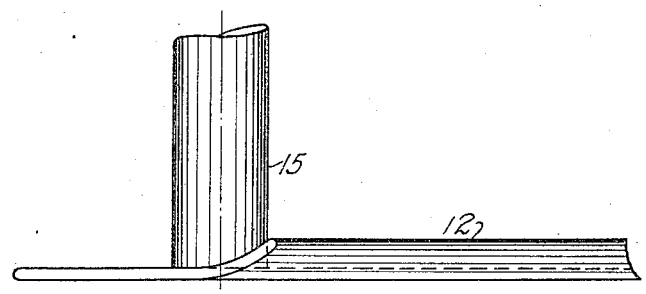
Figure 4:
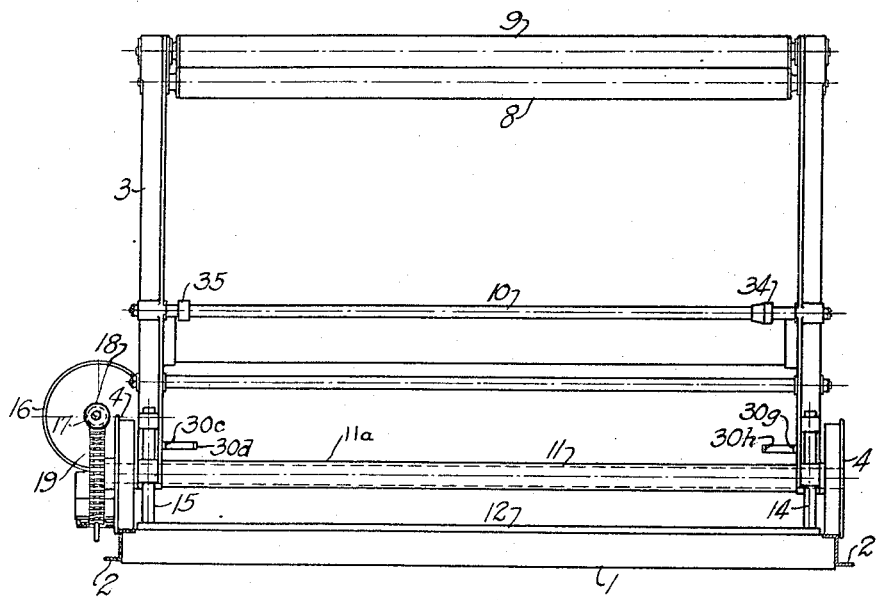

Other features of my machine, together with the construction and combination of parts will be apparent from the detailed description and the accompanying drawings forming a part of this specification and in which similar numerals indicate corresponding parts in all views in which Figure 1 is a side elevation of my machine looking in the direction of line 1—1 of Fig. 2; Fig. 2 is a plan view; Fig. 3 is a sectional view of the carriage taken on line 3—3 of Fig. 2; Fig. 4 is an end view of the carriage looking in the direction of line 4—4 of Fig. 1; Fig. 5 is a perspective view of the runner 12; Figs. 6, 7 and 8 are large scale details of the shoe lifting device; and Fig. 9 is a large scale detail of the striking member 30.

Referring to Figs. 1, 2 and 4, the table 1 upon which the material is to be spread is provided with two Z bar rails, one on each side and running for the full length of the table. The carriage comprising the side frames 3 suitably braced and carrying all the traveling parts of the machine including the motor 16, is mounted upon the four wheels 4 which are adapted to travel upon the rails 2. The worm 18 is fixed to the shaft 17 of the motor 16 and meshes with the worm wheel 19 which is fixed to the axle 11 to which two of the wheels 4 are fixed. The motor 16 is of the reversible type and as the shaft 17 is driven in either direction, the axle 11 is driven in either direction and consequently the carriage is driven in either direction.

If desired a one direction motor may be used instead of the reversible type and a system of reversing gears used therewith for the purpose of reversing the direction of travel of the carriage. This detail is well known to the art and is therefore not shown here.

The cable 20 supplying the current to the motor 16 is suspended from above and is passed over a traveling pulley permitting the cable to travel with the carriage.

The cloth used for making garments is generally furnished either in rolls or in layers folded over each other. This machine is constructed so that the cloth furnished in either form may be spread.

Referring to Figs. 1 and 3, the material 5 is placed in the trough 6, if furnished in folds or the spindle of the roll is placed in the bearings 7, provided in the frame of the carriage 3, if furnished in rolls. The material is then passed between the two friction rollers 8 and 9, over the rod 10, then around the tube 11ª which envelops the axle 11 and then under the runner 12, which is fixed to the two vertical bars 14 and 15 slidably connected to the frame of the carriage 3 and then under the toe of the shoe 22ª which is fixed to the two bars 23ᵇ and 23ᶜ sliding in bearings in the frames 36 and 36ª respectively. If the carriage is traveling in the opposite direction to that shown in Figs. 1 and 3, the fabric is under the runner 13 similar in construction to the runner 12 except that the upturned end is facing in the opposite direction. The runner is connected to the vertical rods 14ª and 15ª slidably connected to the frame 3 of the carriage. The shoe 22ª is made heavy enough to hold the fabric down to the table by friction. If desired a piece of corrugated rubber may be attached to the under side of the toe of the shoe 22ª in order to increase its hold on the fabric, or any other means may be used to increase the frictional resistance of the under side of the toe.

Referring to Figs. 1 and 2 and 6 to 9 inclusive, the shoe 22 is rigidly fixed to the two vertical bars 23 and 23ª which are slidably connected to the brackets 27 and 27ª respectively which are in turn fixed to the Z bars 2. The pin 25 having a flattened portion 26 and the pin 28 are both rotatably mounted in the bracket 27. The pin 28 is fitted snugly while the pin 25 is fitted loosely. The space between the two pins is such as to allow the bar 23 to pass between them. The arms or cams 24 and 24ª are rigidly fixed to the pin 25 and are held in the position indicated in Fig. 6 by the springs 29. The striking member 30 shown in the detail in Fig. 9 is fixed to the frame of the carriage 3 as shown in Figs. 2 and 3 and so located that when the carriage reaches over the bracket 27, the fingers 30ª and 30ᵇ of the striking member 30 will come in contact with the arms 24 and 24ª. As the carriage continues to move toward the arms 24 and 24ª, the fingers 30ª and 30ᵇ pressing against them will cause the pin 25 to move forward since it is fitted loosely, and grip the bar 23 between itself and the pin 28. As the motion of the carriage is continued, the arms 24 and 24ª cause the pin 25 to rotate and due to the rotation of the pin and the gripping action of the pins 25 and 28 upon the bar 23, the latter is raised. This is continued until the flat surface of the pin 25 becomes parallel to the bar 23 thereby releasing the grip on the bar 23 thus allowing it to drop. As the fingers 30ª and 30ᵇ recede from the arms 24 and 24ª, the springs 29 force the arms back to the original position. The bar 23ª is similarly raised and dropped in the bracket 27ª by means of the fingers 30ᵉ and 30ᵍ coming in contact with corresponding arms similar to 24 and 24ª and consequently the shoe 22 is raised and dropped when the carriage reaches the proper position. Similarly the shoe 22ª fixed to the bars 23ᵇ and 23ᶜ is raised and dropped when the carriage reaches the proper position at the other end of the table by means of the fingers 30ᶜ, 30ᵈ, 30ᶠ and 30ʰ coming in contact with corresponding arms, similar to 24 and 24ª.

Let it be assumed that the operation is started from the right end with the edge of the fabric caught under the toe of the shoe 22ª. As the motor is started, the wheels 4 of the carriage travel along the Z bar rails 2 while the edge of the runner 12 covering the full width of the material under it causes it to be spread evenly over the surface of the table 1. As the carriage approaches the other end of the table, the projecting arm of the reversing switch 21 strikes the dog 33 which is fixed to the Z bar 2 at the proper position and thus the switch is set for the reverse position, while at the same time the registering apparatus 37 registers one layer. As this operation is taking place, the upturned end of the runner 13 slips over the toe of the shoe 22. As the runner 13 continues sliding over the shoe 22, the fingers 30ª and 30ᵇ come in contact with the arms 24 and 24ª and the shoe 22 with the runner 13 over it are both raised as previously explained. As the shoe 22 is raised, the runner 12 pushing the fabric forward comes under the shoe and continues moving until the shoe 22 is dropped. While this is taking place, the switch 21 having been set for reversing the motor 16, the carriage continues its motion on account of inertia, until the wheel 4 strikes the rubber bumper 31 fixed to the bumper bracket 32. The latter is set so that the carriage will stop when the runner 12 has reached its extreme position. At this time, the shoe 22 is resting upon the portion of the fabric folded over the runner 12. As the motor reverses the carriage starts to move in the reverse direction and as the runner 12 is highly polished, it slips out from between the two layers of fabric while the latter is held by the shoe 22. The flat edge of the runner 13 now begins to push the fabric forward as it is fed from above and spreads it over the table 1 until another layer is spread, running in the opposite direction. As the carriage reaches the other end, the runner 12 slips over the shoe 22ª while the runner 13 gets under the shoe, and the operation is repeated as at the left end of the table.

The brackets 36 and 36ª and the dogs 33ª are preferably adjustably connected to the Z bar so that the length of each layer of fabric may be varied.

It has been found that in long stretches of fabric, the width is not always uniform. It has also been found desirable to have at least one edge of the layers absolutely even. To accomplish the above I have provided the collar 35 having one face perpendicular to its axis fixed at one end of the bar 10 and another collar 34 having a conical surface at the other end. This causes one edge of the fabric to follow the face of the collar 35, while the conical surface of the collar 34 tends to keep the fabric close to the other end.

If desirable, a stationary guide rod 39 provided with adjustable guides 38 may be provided in order to guide the fabric to the friction rollers 8 and 9. As the thickness of the material to be spread varies, the rate of travel of the carriage may have to be varied. To provide for the above a speed regulator is provided by means of which the speed of the motor may be varied.

The mechanism herein described embodies my preferred form. Many modifications of same may, however, be made employing the same general principles. For example, as previously noted, a system of reversing gearing may be used for reversing the direction of travel of the carriage instead of a reversing motor. Similarly the method employed for lifting and dropping the shoes 22 and 22ª may be modified. I therefore do not wish to limit myself to the exact details of mechanism herein disclosed, but wish to claim all equivalent mechanism.

Having thus described my invention, I claim as new and wish to secure by Letters Patent:

1. In a cloth laying apparatus, the combination of a table, a carriage movable along said table, a spreading member carried by said carriage and movably mounted thereon, adapted to spread the cloth on said table, means for holding the ends of the layers of cloth spread, comprising brackets fixed at the end of the table, vertical members slidably mounted within said brackets, a plate fixed at the bottom of said vertical members adapted to hold the cloth, means for lifting the said vertical members, comprising members rotatably mounted within said brackets adapted to engage with said vertical members and lift them when the former are rotated, arms fixed to said rotatable members, striking fingers fixed to the carriage and traveling therewith adapted to contact with said arms, causing rotation of said rotatable members and thereby the lifting of the cloth holding plate.

2. In a cloth laying apparatus, the combination of a table, a carriage movable along said table, a spreading member carried by said carriage and movably mounted thereon, adapted to spread the cloth on said table, means for holding the ends of the layers of cloth spread, comprising brackets fixed at the end of the table, vertical members slidably mounted within said brackets, a plate fixed at the bottom of said vertical members adapted to hold the cloth, means for lifting the said vertical members, comprising members rotatably mounted within said brackets adapted to engage with said vertical members and lift them when the former are rotated, arms fixed to said rotatable members, striking fingers fixed to the carriage and traveling therewith adapted to contact with said arms, causing rotation of said rotatable members and thereby the lifting of the cloth holding plate, and means for dropping said holding plate when the carriage has reached its extreme position, consisting of means for disengaging said vertical members from said rotatable members after the latter have rotated a fixed amount.

3. In a cloth laying apparatus, the combination of a table, a carriage movable along said table, a spreading member carried by said carriage and movably mounted thereon, adapted to spread the cloth on said table, means for holding the ends of the layers of cloth spread, comprising brackets fixed at the end of the table, vertical bars slidingly mounted within said brackets, a plate fixed to said bars adapted to hold the cloth, means for lifting the said bars comprising two pins for each bar rotatably mounted in said brackets and adapted to grip the said bars, arms fixed to one pin of each pair, striking fingers fixed to the carriage and traveling therewith adapted to contact with the arms, causing rotation of the latter, thereby causing the lifting of the vertical bars.

4. In a cloth laying apparatus, the combination of a table, a carriage movable along said table, a spreading member carried by said carriage and movably mounted thereon, adapted to spread the cloth on said table, means for holding the ends of the layers of cloth spread, comprising brackets fixed at the end of the table, vertical bars slidingly mounted within said brackets, a plate fixed to the said bars adapted to hold the fabric, means for lifting the said bars and dropping them thereafter, comprising two pins for each bar rotatably mounted in said brackets and adapted to grip the said vertical bars, one pin of each pair having a portion of its surface flattened, arms fixed to each of said pins having flattened surfaces, striking fingers fixed to the carriage and traveling therewith, adapted to contact with the arms, causing rotation of the latter, thereby causing first the lifting of the vertical bars and thereafter the dropping of the latter as the grip on same is released by the flattened surfaces of the pins.

5. In a cloth laying apparatus, the combination of a table, a carriage movable along said table, an electric motor mounted on said carriage and traveling therewith, two spreading members, carried by said carriage, each member comprising two vertically sliding bars and a flat plate having one of its longitudinal edges turned upwardly fixed thereto, one of said spreading members being adapted to spread the cloth on said table when the carriage is traveling in one direction and the other member being adapted to spread it when the carriage is traveling in the opposite direction, the spreading being accomplished by one spreading member sliding over the layer while its full weight is pressing thereon and its edge is pushing the cloth ahead as it is fed from above and is spread thereunder, the second spreading member sliding just ahead of the layer being spread, two holding members, one member mounted at one end of the table and the other member mounted at the other end of the table, each of the said members comprising a flat plate fixed to vertically slidable members and adapted to hold the ends of the layers of cloth brought thereto by the spreading member by means of the frictional resistance of its under surface, means for automatically raising the holding member above the table when the spreading member is within proximity of the said holding member and the idle forward spreading member has slipped over the top of the holding member, comprising rotatable members adapted to engage with said vertically slidable members and lift them when the former are rotated, thereby permitting the rear spreading member to push the cloth underneath the holding member, the said rotatable member being constructed to cause the latter to drop automatically over the end of the layer of cloth when the spreading member reaches its extreme position, means for automatically reversing the direction of travel of the carriage after the holding member has engaged with the edge of the layer last spread, whereby the rear spreading member slips from beneath the holding member and becomes an idly sliding forward member while the forward spreading member slips from above the holding member and becomes a rear spreading member.

6. In a cloth laying apparatus, the combination of a table, a carriage movable along said table, an electric motor mounted on said carriage and traveling therewith, two spreading members, carried by said carriage, each member comprising two vertically sliding bars and a flat plate having one of its longitudinal edges turned upwardly fixed thereto, one of said spreading members being adapted to spread the cloth on said table when the carriage is traveling in one direction and the other member being adapted to spread it when the carriage is traveling in the opposite direction, the spreading being accomplished by one spreading member sliding over the layer while its full weight is pressing thereon and its edge is pushing the cloth ahead as it is fed from above and is spread thereunder, the second spreading member sliding just ahead of the layer being spread, means for holding the ends of the layers of cloth at each end of the table, comprising brackets fixed at both ends of the table, vertical members slidably mounted within said brackets, a plate fixed at the bottom of said vertical members adapted to hold the cloth, means for lifting the said vertical members, comprising members rotatably mounted within said brackets adapted to engage with said vertical members and lift them when the former are rotated, arms fixed to said rotatable members, striking fingers fixed to the carriage and traveling therewith adapted to contact with said arms, causing rotation of said rotatable members and thereby the lifting of the cloth holding plate, the said rotatable members being constructed to cause the dropping said holding plate when the carriage has reached its extreme position, by the disengagement of said vertical members from said rotatable members after the latter have rotated a fixed amount.

7. In a cloth laying apparatus, the combination of a table, a carriage movable along said table, an electric motor mounted on said carriage and traveling therewith, two spreading members, carried by said carriage, each member comprising two vertically sliding bars and a flat plate having one of its longitudinal edges turned upwardly fixed thereto, one of said spreading members being adapted to spread the cloth on said table when the carriage is traveling in one direction and the other member being adapted to spread it when the carriage is traveling in the opposite direction, the spreading being accomplished by one spreading member sliding over the layer while its full weight is pressing thereon and its edge is pushing the cloth ahead as it is fed from above and is spread thereunder, the second spreading member sliding just ahead of the layer being spread, means for holding the ends of the layers of cloth at each end of the table, comprising brackets fixed at both ends of the table, vertical bars slidingly mounted within said brackets, a plate fixed to the said bars adapted to hold the fabric, means for lifting the said bars and dropping them thereafter, comprising two pins for each bar rotatably mounted in said brackets and adapted to grip the said vertical bars, one pin of each pair having a portion of its surface flattened, arms fixed to each of said pins having flattened surfaces, striking fingers fixed to the carriage and traveling therewith, adapted to contact with the arms, causing rotation of the latter, thereby causing first the lifting of the vertical bars and thereafter the dropping of the latter as the grip on same is released by the flattened surfaces of the pins.

8. In a cloth laying apparatus, the combination of a table, a carriage movable along said table, two spreading members carried by said carriage and movably mounted thereon, adapted to spread the cloth on said table by sliding thereover while the weight of said spreading members is pressing thereon and their edges push the cloth ahead as it is fed from above, one spreading member being adapted to spread a layer in one direction while the other is adapted to spread a layer in the opposite direction, two holding members, one mounted at each end of the table, each member consisting of a flat plate fixed to vertically slidable members and adapted to hold the cloth by its own weight, means for automatically raising one of the holding members above the table when the corresponding spreading member is within proximity of the holding member, comprising rotatable members adapted to engage with said vertically slidable members and lift them when the former are rotated, thereby permitting the spreading member to push the cloth underneath the holding member, the said rotatable members being constructed to cause the holding member to automatically drop over the end of the layer of cloth when the spreading member reaches its extreme position, and means for reversing the direction of travel of the carriage when the spreading member reaches its extreme position at each end, comprising tripping dogs fixed to the table at each end and a direction controlling switch mounted on the carriage traveling therewith, having a projecting arm adapted to contact with each of the tripping dogs, whereby the direction of the carriage is reversed.

Signed at New York in the county of New York and State of New York this 25th day of October A. D. 1915.

MAURICE SAMBURG.

Copies of this patent may be obtained for five cents each, by addressing the "Commissioner of Patents, Washington, D. C."